(12) United States Patent
Scothern et al.

(10) Patent No.: US 11,293,345 B2
(45) Date of Patent: Apr. 5, 2022

(54) GAS TURBINE ENGINE

(71) Applicant: ROLLS-ROYCE plc, London (GB)

(72) Inventors: David P. Scothern, Derby (GB);
Steven P. Culwick, Derby (GB); Shane Perera, Derby (GB); Edward J. Spalton, Derby (GB)

(73) Assignee: Rolls-Royce plc, London (GB)

( * ) Notice: Subject to any disclaimer, the term of this patent is extended or adjusted under 35 U.S.C. 154(b) by 304 days.

(21) Appl. No.: 16/391,592

(22) Filed: Apr. 23, 2019

(65) Prior Publication Data

US 2020/0025078 A1    Jan. 23, 2020

(30) Foreign Application Priority Data

May 15, 2018 (GB) ................................. 1807840

(51) Int. Cl.
*F02C 7/00* (2006.01)
*F02C 7/047* (2006.01)
*F02C 9/18* (2006.01)
*B64D 33/02* (2006.01)
*F01D 25/02* (2006.01)

(52) U.S. Cl.
CPC ............. *F02C 7/047* (2013.01); *F02C 9/18* (2013.01); *B64D 2033/0233* (2013.01); *F01D 25/02* (2013.01); *F05D 2270/101* (2013.01); *F05D 2270/303* (2013.01)

(58) Field of Classification Search
CPC ... F02C 7/047; F02C 6/08; F02C 9/18; B64D 2013/0607; B64D 2013/0618; B64D 15/00; B64D 2033/0233; F01D 25/02; F05D 2270/101; F05D 2270/303
See application file for complete search history.

(56) References Cited

U.S. PATENT DOCUMENTS

| 2,647,366 | A | 8/1953 | McCann | |
|---|---|---|---|---|
| 2006/0196192 | A1* | 9/2006 | Richards | F02C 7/32 60/782 |
| 2009/0108134 | A1* | 4/2009 | Thodiyil | C23C 4/131 244/134 B |

(Continued)

FOREIGN PATENT DOCUMENTS

| EP | 3179073 A1 | 6/2017 |
|---|---|---|
| EP | 3225813 | 10/2017 |
| WO | 2014052297 | 4/2014 |

OTHER PUBLICATIONS

Extended European Search Report from counterpart EP Application No. 19169148.4 dated Oct. 9, 2019, 7 pgs. (6698 CSM).

(Continued)

*Primary Examiner* — Edwin Kang
(74) *Attorney, Agent, or Firm* — Shumaker & Sieffert, P.A.

(57) ABSTRACT

A gas turbine engine comprising: an engine core comprising a compressor; a compressor bleed valve in communication with the compressor and configured to release bleed air from the compressor; at least one component provided at the inlet of the engine core having a de-icing conduit, configured to receive the bleed air; and a flow controller, configured to provide bleed air to the de-icing conduit of the at least one component in response to either or both of a requirement to de-ice the component and a requirement to release bleed air from the compressor to optimise operation of the core.

15 Claims, 5 Drawing Sheets

(56) References Cited

U.S. PATENT DOCUMENTS

| | | | |
|---|---|---|---|
| 2009/0293445 A1* | 12/2009 | Ress, Jr. | F02C 7/32 60/39.15 |
| 2010/0281880 A1 | 11/2010 | Porte | |
| 2010/0313573 A1 | 12/2010 | Walters et al. | |
| 2011/0056210 A1* | 3/2011 | Griffin | F04D 27/0223 60/773 |
| 2013/0175001 A1* | 7/2013 | Cheong | F02K 3/115 165/41 |
| 2013/0195624 A1* | 8/2013 | Schwarz | F01D 25/162 415/122.1 |
| 2013/0195627 A1* | 8/2013 | Glahn | F01D 11/001 415/126 |
| 2013/0259660 A1* | 10/2013 | Dale | F01D 11/001 415/170.1 |
| 2017/0167496 A1* | 6/2017 | Klosinski | F04D 27/0276 |
| 2017/0218852 A1* | 8/2017 | Klosinski | F02C 9/18 |
| 2017/0234220 A1* | 8/2017 | Saraswathi | F02C 7/047 415/1 |
| 2017/0234239 A1* | 8/2017 | Saraswathi | F02C 7/045 415/1 |
| 2017/0267360 A1 | 9/2017 | Heid | |
| 2018/0023475 A1* | 1/2018 | Xu | F01D 9/065 60/806 |
| 2018/0023480 A1* | 1/2018 | Lefebvre | F02C 3/145 60/792 |
| 2018/0216535 A1* | 8/2018 | Hill | F01D 9/065 |
| 2018/0223740 A1* | 8/2018 | Forest | F02C 7/32 |

OTHER PUBLICATIONS

Response to Extended European Search Report from counterpart EP Application No. 19169148.4 dated Oct. 9, 2019, filed May 20, 2020, 58 pgs. (6698 CSM).

Great Britain search report dated Nov. 7, 2018, issued in GB Patent Application No. 1807840.2.

* cited by examiner

GAS TURBINE ENGINE

CROSS-REFERENCE TO RELATED APPLICATIONS

This specification is based upon and claims the benefit of priority from United Kingdom patent application Number GB 1807840.2 filed on May 15, 2018, the entire contents of which are incorporated herein by reference.

BACKGROUND

Technical Field

The disclosure relates to gas turbine engines, in particular gas turbine engines comprising a compressor bleed valve for releasing bleed air from a compressor.

Description of Related Art

Gas turbine engines may require compressor bleed valves to release pressure from compressor stages within the gas turbine engine core. In some gas turbine engines, compressor bleed air is exhausted through outlets within an outer casing of the core into the bypass duct of the engine. In a typical arrangement, a compressor bleed valve is provided in the compressor casing (or inner core casing) and ducted to an aperture in the outer casing. Such arrangements require a reinforced aperture in the outer casing, a seal and a seal land, all of which add weight to the gas turbine engine core. Additionally, exhausting compressor bleed air into the bypass duct risks thermal damage to the nacelle and may generate additional noise.

It is an aim of the present disclosure to at least partially address the problems with the gas turbine engines discussed above.

SUMMARY

According to a first aspect there is provided a gas turbine engine comprising:
an engine core comprising a compressor;
a compressor bleed valve in communication with the compressor and configured to release bleed air from the compressor;
at least one component provided at the inlet of the engine core having a de-icing conduit, configured to receive the bleed air; and
a flow controller, configured to provide bleed air to the de-icing conduit of the at least one component in response to either or both of a requirement to de-ice the component and a requirement to release bleed air from the compressor to optimise operation of the core;
wherein the flow controller is configured to provide a first mass flow rate of bleed air when the bleed air is provided in response to a requirement to de-ice the component and a second mass flow rate of bleed air, different from the first mass flow rate, when the bleed air is provided in response to a requirement to release bleed air from the compressor to optimise operation of the core, and to provide the higher of the first and second mass flow rates of bleed air when the bleed air is required both for de-icing the component and to optimise operation of the core.

In an arrangement, the gas turbine engine further comprises an icing detector configured to detect a level of icing on the at least one component. The flow controller may be configured to provide a mass flow rate of bleed air to the de-icing conduit of the at least one component that is determined based on the level of icing.

In an arrangement, the flow controller is configured to provide a varying mass flow rate of bleed air according to a predetermined schedule.

In an arrangement, the flow controller comprises at least one flow control valve distinct from the compressor bleed valve.

In an arrangement, the gas turbine engine further comprises a duct between the compressor bleed valve and the flow controller.

In an arrangement, the flow controller is an integrated part of the compressor bleed valve.

In an arrangement, the flow controller comprises a continuously modulated valve.

In an arrangement, the flow controller comprises first and second valves, each configured to be set only to an open position or a closed position, the first and second valves arranged in parallel in the flow path of the bleed air.

In an arrangement, each of the first and second valves of the flow controller may be a compressor bleed valve.

In an arrangement, the flow controller is configured such that the gas flow rate through the first valve when set to an open position is different from the gas flow rate through the second valve when set to an open position.

In an arrangement, the at least one component having a de-icing conduit is at least one of a static surface at the inlet of the engine core and a variable inlet guide vane.

In an arrangement, the gas turbine engine further comprises a second compressor bleed valve, configured to release bleed air from the compressor.

In an arrangement, bleed air from the second compressor bleed valve is configured to exhaust bleed air to an air flow external to the engine core.

In an arrangement, the first and second compressor bleed valves release bleed air from different compressors or from different compressor stages.

In an arrangement, the gas turbine engine further comprises:
a turbine and a core shaft connecting the turbine to the compressor, within the engine core;
a fan located upstream of the engine core, the fan comprising a plurality of fan blades;
a gearbox that receives an input from the core shaft and outputs drive to the fan so as to drive the fan at a lower rotational speed than the core shaft.

In an arrangement, the turbine comprises a first turbine and a second turbine, the compressor comprises a first compressor and a second compressor, and the core shaft comprises a first core shaft connecting the first turbine to the first compressor and a second core shaft connecting the second turbine to the second compressor; and the second turbine, second compressor and second core shaft are arranged to rotate at a higher rotational speed than the first core shaft.

In an arrangement, the gearbox receives an input from the first core shaft.

In an arrangement, the compressor bleed valve is configured to release bleed air from the second compressor.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
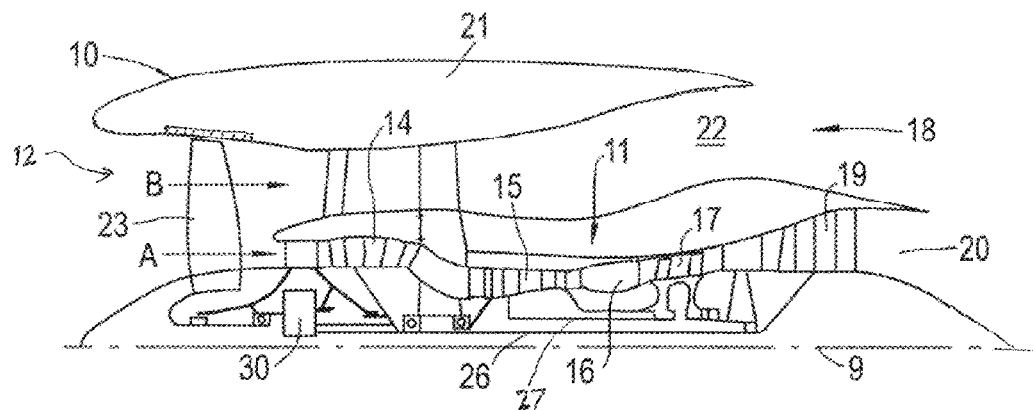
FIG. 1 is a sectional side view of a gas turbine engine.

As noted elsewhere herein, the present disclosure relates to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forward most) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4 (all units in this paragraph being) $Jkg^{-1}K^{-1}/(ms^{-1})^2$. The fan tip loading may be in an inclusive range bounded by any two of the values in the previous sentence (i.e. the values may form upper or lower bounds), for example in the range of from 0.28 to 0.31 or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 13 to 16, or 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C. Purely by way of further example, the cruise conditions may correspond to: a forward Mach number of 0.85; a pressure of 24000 Pa; and a temperature of −54 degrees C. (which may be standard atmospheric conditions at 35000 ft).

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
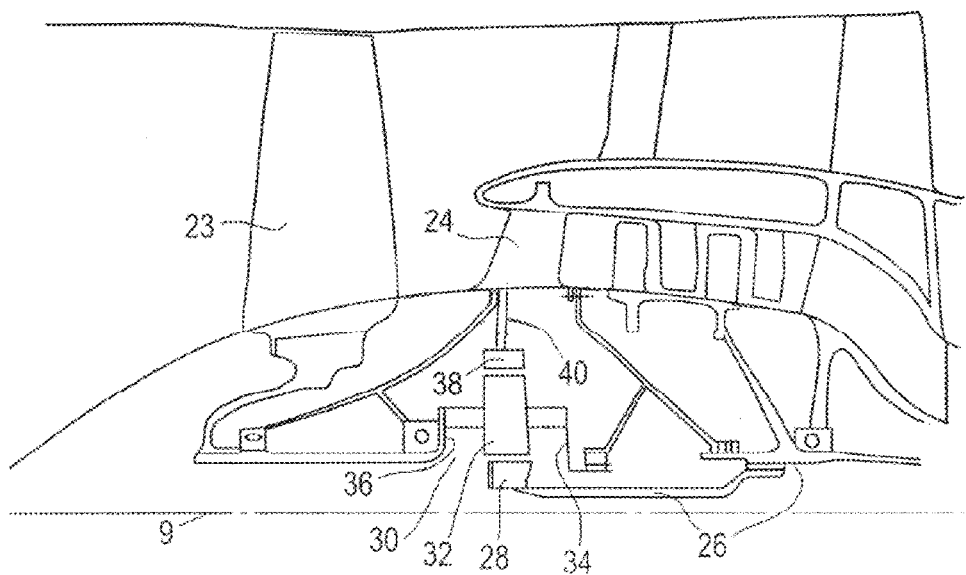
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
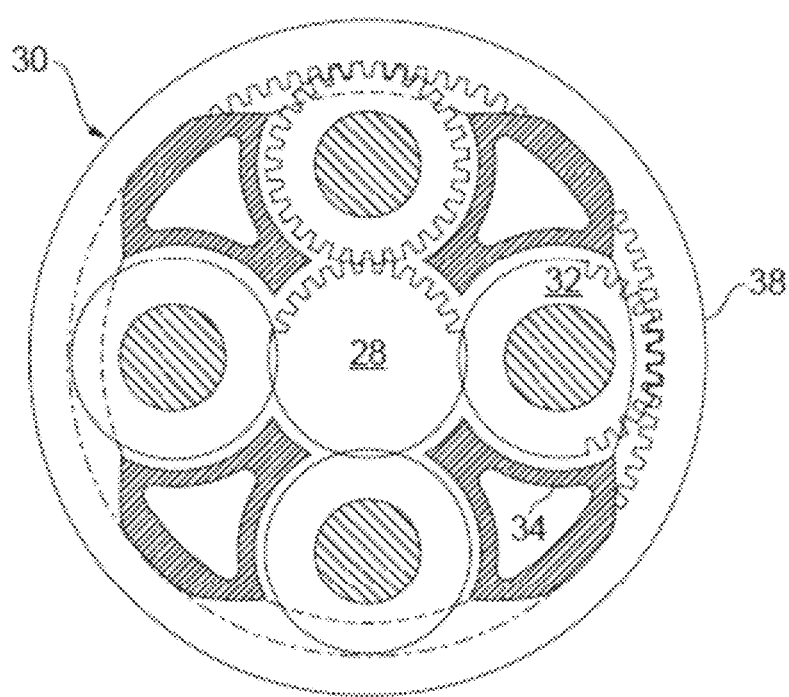
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
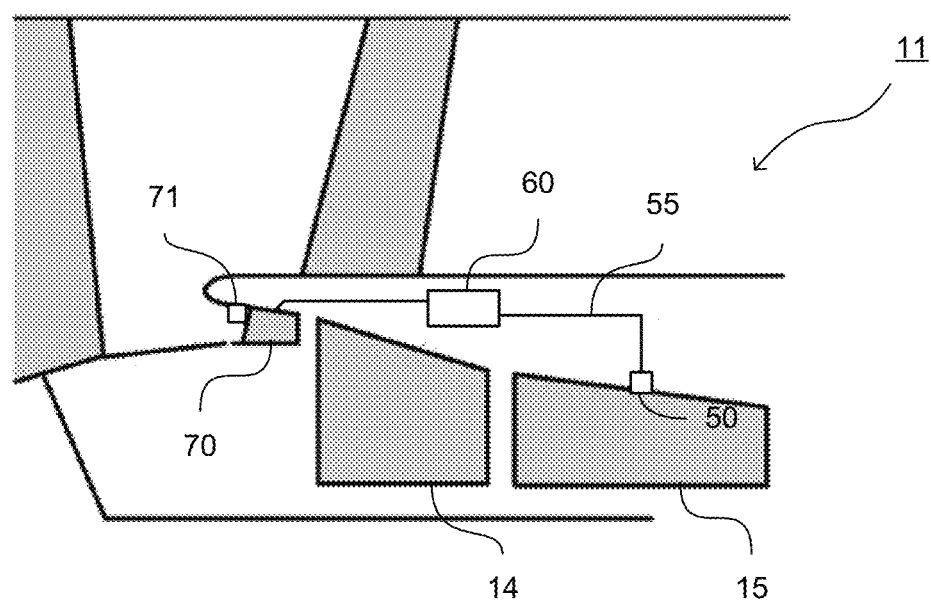
FIG. 4 is a schematic depiction of an arrangement for releasing bleed air according to the present disclosure.

FIG. 4 schematically depicts an arrangement according to the present disclosure. As shown, a compressor bleed valve 50 is provided to one of the compressors 15 and configured to be able to release bleed air from the compressor 15. The bleed air is ducted via a flow controller 60 to the inlet of the engine core 11. One or more components 70 at the inlet of the engine core 11 may be provided with de-icing conduits that, when provided with hot gas, prevent or reduce the build-up of ice on the component 70. In the present arrangement, the bleed air is provided to the de-icing conduit within the one or more components 70 at the inlet to the engine core 11.

It should be appreciated that the bleed air may be provided to a plurality of components at the inlet to the engine core 11 that may benefit from icing protection. In examples, the components 70 may include one or more of a static surface at the inlet of the engine core 11 and a variable inlet guide vane.

The flow controller may be configured to provide bleed air from the compressor bleed valve 50 to the one or more components 70 at the inlet to the engine core only when it is required. In an arrangement, the flow controller may be configured to provide the bleed air to the one or more components 70 in response to either or both of a requirement to de-ice the component and a requirement to release bleed air from the compressor 15 to optimise operation of the core 11. It should be appreciated, therefore, that in such an arrangement bleed air may be released from the compressor 15 when it is required to de-ice a component 70 at the inlet to the engine core 11, even if there is no requirement to release bleed air from the compressor 15 for the purpose of optimising operation of the core 11. Similarly, bleed air may be provided to de-icing conduits of the at least one component 70 at the inlet to the core 11 when it is not required to de-ice the component if it is desirable to release bleed air from the compressor 15 in order to optimise operation of the core 11.

This arrangement may therefore result in bleed air being released from the compressor 15 or the de-icing system being operational when it is not otherwise necessary. However, by combining a bleed air system with a core inlet de-icing system, the overall weight of the gas turbine engine may be reduced and/or constraints on space for other components within the gas turbine engine may be reduced.

It should be appreciated that, in this disclosure, references to releasing bleed air from the compressor 15 to optimise operation of the core 11 are not intended to suggest that the core operates in an ideal state. Instead, this merely indicates that, under conditions in which the gas turbine engine is operating, as part of the process of regulating the operation of the engine core 11, the operation of the engine core 11 is improved by releasing bleed air from the compressor 15 in comparison with operating the engine core without a release of bleed air from the compressor 15.

The flow controller 60 may be configured to control the mass flow rate of the bleed air transferred from the compressor bleed valve 50 to the at least one component 70 at the inlet of the engine core 11 depending on the cause of providing the bleed air. For example, the flow controller may provide a first mass flow rate of bleed air when the bleed air is provided to de-ice the at least one component 70 at the inlet of the engine core 11 and a second mass flow rate of bleed air, which may be different from the first mass flow rate, when the bleed air is provided to release bleed air from the compressor 15 for the purposes of regulating the operation of the engine core 11.

It should be appreciated that, although a flow controller 60 may be configured to control the mass flow rate of the bleed air transferred from the compressor bleed valve 50 to the at least one component 70 at the inlet of the engine core 11, the mass flow rate will also be determined by other factors. For example, the configuration of the conduit between the compressor bleed valve 50 and the at least one component 70 at the inlet of the engine core 11 and/or the configuration of an orifice in the component 70 through which the bleed air is exhausted may affect the mass flow rate of the bleed air. In this context, the flow controller 60 may be configured to adjust the mass flow rate of the bleed air relative to a default mass flow rate.

In an arrangement, the desirable first and second mass flow rates of bleed air, or at least their relative sizes, namely which is the larger, may be predetermined for a particular gas turbine engine. It should be appreciated, however, that the first and second mass flow rates of bleed air may not be fixed numeric values but each may be considered to be a function of the operating state of the gas turbine engine and/or the conditions in which the gas turbine engine is operating.

In an arrangement, the flow controller 60 may be configured such that, when it is determined that the bleed air is required both for the purpose of de-icing the at least one component 70 at the inlet to the engine core 11 and for the control of the operation of the engine core 11, the flow controller provides the higher of the first and second mass flow rates of bleed air.

In an arrangement, the gas turbine engine may include at least one icing detector 71 that is configured to detect the presence and/or level of icing on the at least one component 70 provided at the inlet of the engine core 11. The flow controller 60 may be configured to provide bleed air to the component 70 at least when the icing detector 71 detects the presence of icing. Alternatively or additionally, the flow controller 60 may be configured to provide bleed air to the component 70 based on information relating to the conditions under which the gas turbine engine is operating, for example when those conditions indicate that icing may be possible and/or likely.

In an arrangement, the flow controller 60 may be configured to adjust the mass flow rate of bleed air provided to the at least one component 70 based on a level of icing detected by the icing detector 71. For example, the greater the level of icing detected, the greater the mass flow rate of bleed air that may be provided to the at least one component 70.

In an arrangement, the flow controller 60 may be configured to provide varying mass flow rates of bleed air to the component 70 based on a predetermined schedule. For example, such an arrangement may be provided in order to optimise the operation of the core 11 during a start-up procedure and/or a shut-down procedure for the gas turbine engine.

It should also be appreciated that the operation of the flow controller 60 may be a combination of the control modes discussed above. For example, the flow controller 60 may follow a predetermined schedule during a start-up operation, but be responsive to data input from, for example an icing detector 71 and/or sensors monitoring the operation of the gas turbine engine after the start-up operation completes.

As is schematically depicted in FIG. 4, the flow controller 60 may be separate from the compressor bleed valve 50. For example, the compressor bleed valve 50, which may be mounted on the compressor casing, may be configured to be either open or closed and a distinct flow control valve may be provided within the flow controller 60 in order to control the mass flow rate of bleed air from the compressor bleed valve 50 to the at least one component 70 and the inlet to the engine core 11.

The flow control valve may be a continuously modulated valve, namely one that can be set to a plurality of levels, in order to regulate the mass flow rate of bleed air provided to the component 70. In such an arrangement, the flow controller 60 may be provided at any convenient location along a duct 55 connecting the compressor bleed valve 50 to the at least component 70.

Figure 5:
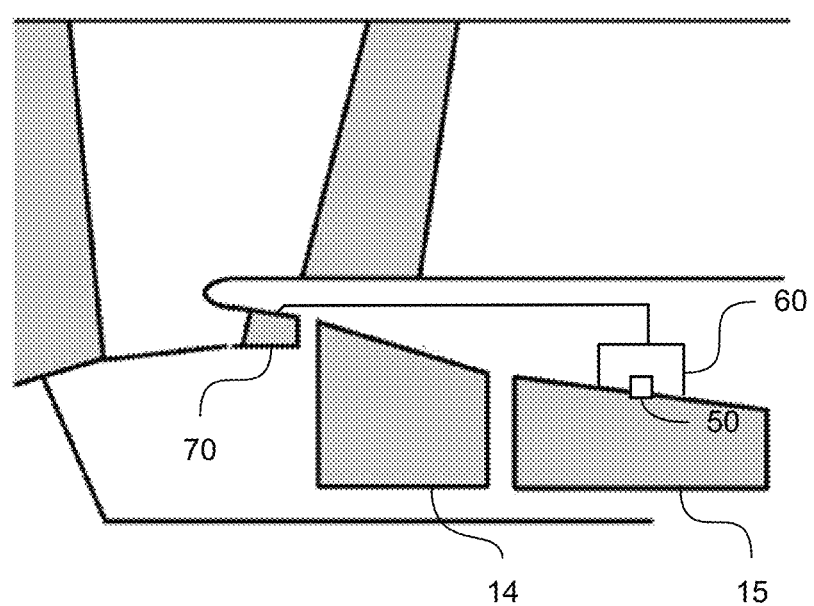
FIG. 5 is a schematic depiction of an alternative arrangement for releasing bleed air according to the present disclosure.

In an alternative arrangement schematically depicted in FIG. 5, the flow controller 60 may be an integrated part of the compressor bleed valve 50. In such an arrangement, the compressor bleed valve 50 may have a single valve that both controls whether bleed air is released from the compressor 15 and controls the mass flow rate of bleed air provided to the at least one component 70 at the inlet to the engine core 11. In an arrangement, the compressor bleed valve 50 may be a continuously modulated valve in order that it may be set to a range of opening states corresponding to a plurality of mass flow rates of bleed air being provided to the at least one component 70.

Figure 6:
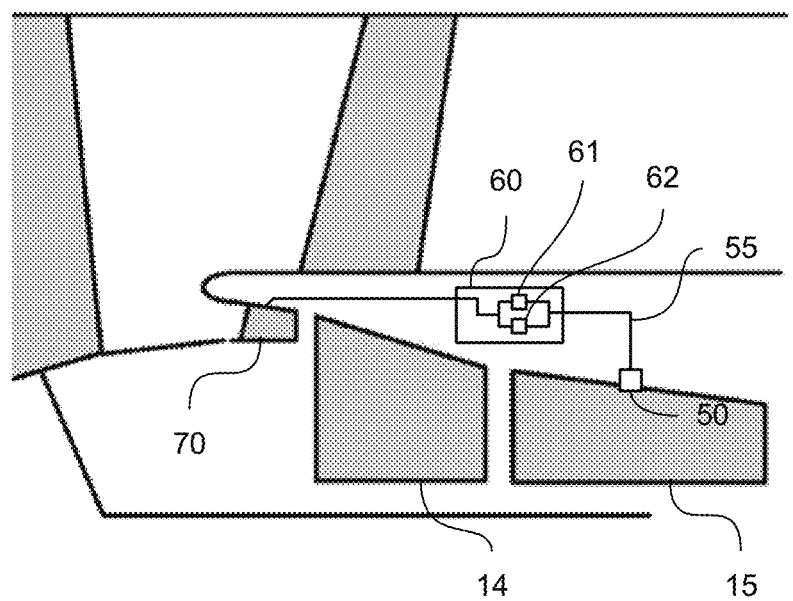
FIG. 6 is a schematic depiction of an alternative arrangement for releasing bleed air according to the present disclosure.

In an arrangement, the flow controller 60 may have at least first and second flow control valves 61, 62 arranged in parallel in the flow path of the bleed air, as schematically depicted in FIG. 6. The first and second flow control valves 61, 62 may be configured such that they may be set only between an open position and a closed position. Such an arrangement may be easier to control and/or have a more robust control system than an arrangement in which a single flow control valve can be set to a plurality of different levels.

In the arrangement depicted in FIG. 6 having first and second flow control valve 61, 62 in parallel, the flow controller can overall provide at least two different mass flow rates of bleed air, a lower level when only one of the flow control valves 61, 62 is open and a higher rate when both of the flow control valve 61, 62 is open.

In an arrangement, the first and second flow control valve 61, 62 may be configured such that they pass different mass flow rates of bleed air when each is open. Such an arrangement may enable the flow controller 60 to provide three different levels of mass flow rate of bleed air, a first mass flow rate when a first flow control valve 61 is open, a second mass flow rate when the second flow control valve 62 is open and a third mass flow rate when both flow control valves 61, 62 are open. It should be appreciated that, if additional levels of mass flow rate of bleed air are required, additional flow control valves may be added in parallel.

Figure 7:
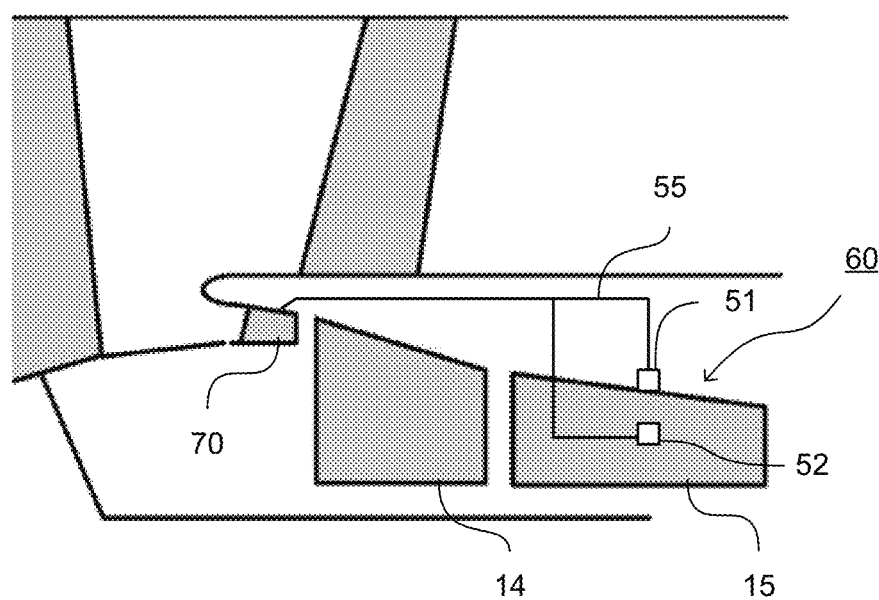
FIG. 7 is a schematic depiction of an alternative arrangement for releasing bleed air according to the present disclosure.

As schematically depicted in FIG. 7, a simplified control system using plural flow control valves in parallel may also be provided in an arrangement in which the flow controller 60 is integrated with the compressor bleed valve. For example, two or more compressor bleed valves 51, 52 may be provided to the compressor 15 and connected in parallel to a duct 55 providing the bleed air to the one or more components 70 at the inlet to the engine core 11. Each of the compressor bleed valves 51, 52 may be configured to either be open or closed. However, in corresponding fashion to that discussed above in relation to the arrangement depicted in FIG. 6, by opening one or both of the compressor bleed valves 51, 52, plural different levels of mass flow rate of bleed air may be provided to the at least one component 70. Similarly, by configuring the compressor bleed valves, 51, 52 such that, in their respective open states they release different mass flow rates of bleed air, further levels of control may be provided.

As depicted in FIGS. 4 to 7 and discussed above, in an arrangement of an engine core 11 having two compressors 14, 15, the compressor bleed valve 50 may be configured to release bleed air from the compressor 15 that operates at a higher pressure. However, an arrangement such as that discussed above may alternatively or additionally be provided for a compressor bleed valve arranged to release bleed air from the compressor operating at a lower pressure and/or from a compressor of an engine core having only one compressor, for example.

Figure 8:
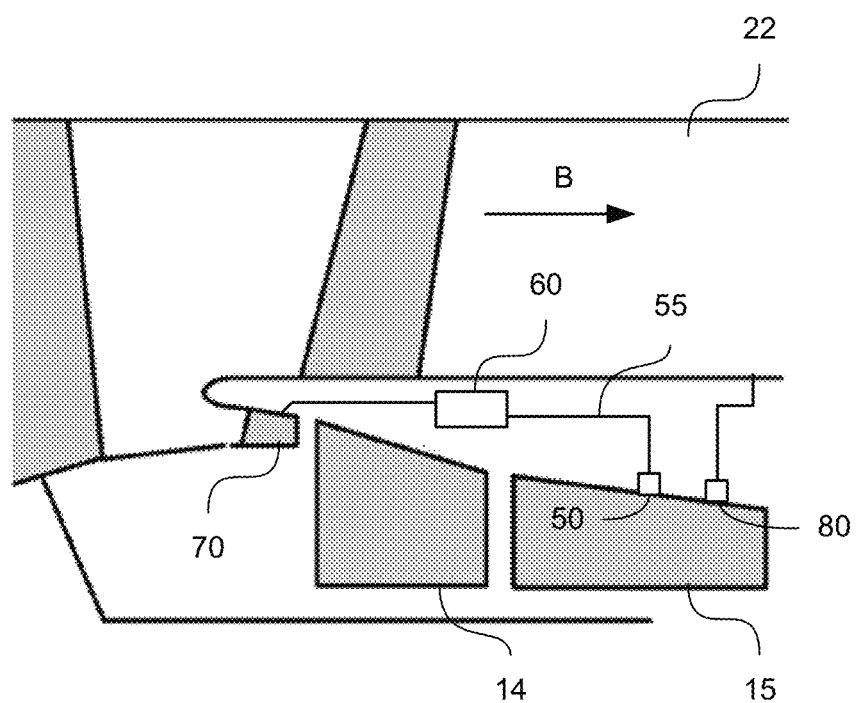
FIG. 8 is a schematic depiction of an alternative arrangement for releasing bleed air according to the present disclosure.

In an arrangement, any of the arrangements discussed above may be provided in conjunction with a second compressor bleed valve 80, which is configured to release bleed air from a compressor within the engine core and exhaust it via a different route, namely not to the at least one component 70 at the inlet to the engine core. For example, as schematically depicted in FIG. 8, a second compressor bleed valve 80 may be configured to exhaust bleed air to an air flow external to the engine core 11, such as into a bypass air flow B that flows through a bypass duct 22. In an arrangement having such a second compressor bleed valve 80, the first and second compressor bleed valves 50, 80 may release bleed air from different compressor stages within one compressor 14, 15 or from different compressors 14, 15.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine comprising:
   an engine core comprising a compressor;
   a compressor bleed valve in communication with the compressor and configured to release bleed air from the compressor;
   at least one component provided at an inlet of the engine core, wherein the at least one component has a de-icing conduit configured to receive the bleed air; and
   a flow controller configured to provide the bleed air to the de-icing conduit of the at least one component in response to either or both of a first requirement to de-ice the at least one component or a second requirement to release the bleed air from the compressor to optimize operation of the engine core, wherein the flow controller comprises a first valve and a second valve, each of the first valve and the second valve being set only to an open position or a closed position, the first and second valves arranged in parallel in a flow path of the bleed air;
   wherein the flow controller provides a first mass flow rate of the bleed air when the bleed air is provided in response to the first requirement to de-ice the at least one component and a second mass flow rate of the bleed air, different from the first mass flow rate, when the bleed air is provided in response to the second requirement to release the bleed air from the compressor to optimize the operation of the engine core, and provides a higher of the first and second mass flow rates of the bleed air when the bleed air is required both for de-icing the at least one component and to optimize the operation of the engine core.

2. The gas turbine engine of claim 1, further comprising an icing detector that detects a level of icing on the at least one component; wherein the flow controller provides the first mass flow rate of the bleed air to the de-icing conduit of the at least one component that is determined based on the level of icing.

3. The gas turbine engine of claim 1, wherein the flow controller provides a varying mass flow rate of the bleed air according to a predetermined schedule.

4. The gas turbine engine of claim 1, wherein at least one of the first and second valves of the flow controller is distinct from the compressor bleed valve.

5. The gas turbine engine of claim 4, further comprising a duct between the compressor bleed valve and the flow controller.

6. The gas turbine engine of claim 1, wherein the flow controller functions as a continuously modulated valve.

7. The gas turbine engine of claim 1, wherein a first gas flow rate through the first valve when set to the open position is different from a second gas flow rate through the second valve when set to the open position.

8. The gas turbine engine of claim 1, wherein the at least one component having the de-icing conduit is at least one of a static surface at the inlet of the engine core and a variable inlet guide vane.

9. The gas turbine engine of claim 1, wherein the compressor bleed valve is a first compressor bleed valve, wherein the bleed air is a first bleed air, further comprising a second compressor bleed valve configured to release second bleed air from the compressor.

10. The gas turbine engine of claim 9, wherein the second compressor bleed valve exhausts the second bleed air to an air flow external to the engine core.

11. The gas turbine engine of claim 9, wherein the first and second compressor bleed valves release the first bleed air and the second bleed air from different compressors or from different compressor stages.

12. The gas turbine engine of claim 1, further comprising:
   a turbine and a core shaft connecting the turbine to the compressor, within the engine core;

a fan located upstream of the engine core, the fan comprising a plurality of fan blades;

a gearbox that receives an input from the core shaft and outputs drive to the fan so as to drive the fan at a lower rotational speed than the core shaft.

13. The gas turbine engine of claim 12, wherein:

the turbine comprises a first turbine and a second turbine, the compressor comprises a first compressor and a second compressor, and the core shaft comprises a first core shaft connecting the first turbine to the first compressor and a second core shaft connecting the second turbine to the second compressor; and the second turbine, second compressor, and second core shaft are arranged to rotate at a higher rotational speed than the first core shaft.

14. The gas turbine engine of claim 13, wherein the gearbox receives an input from the first core shaft.

15. The gas turbine engine of claim 13, wherein the compressor bleed valve releases the bleed air from the second compressor.

* * * * *